Figure 1:
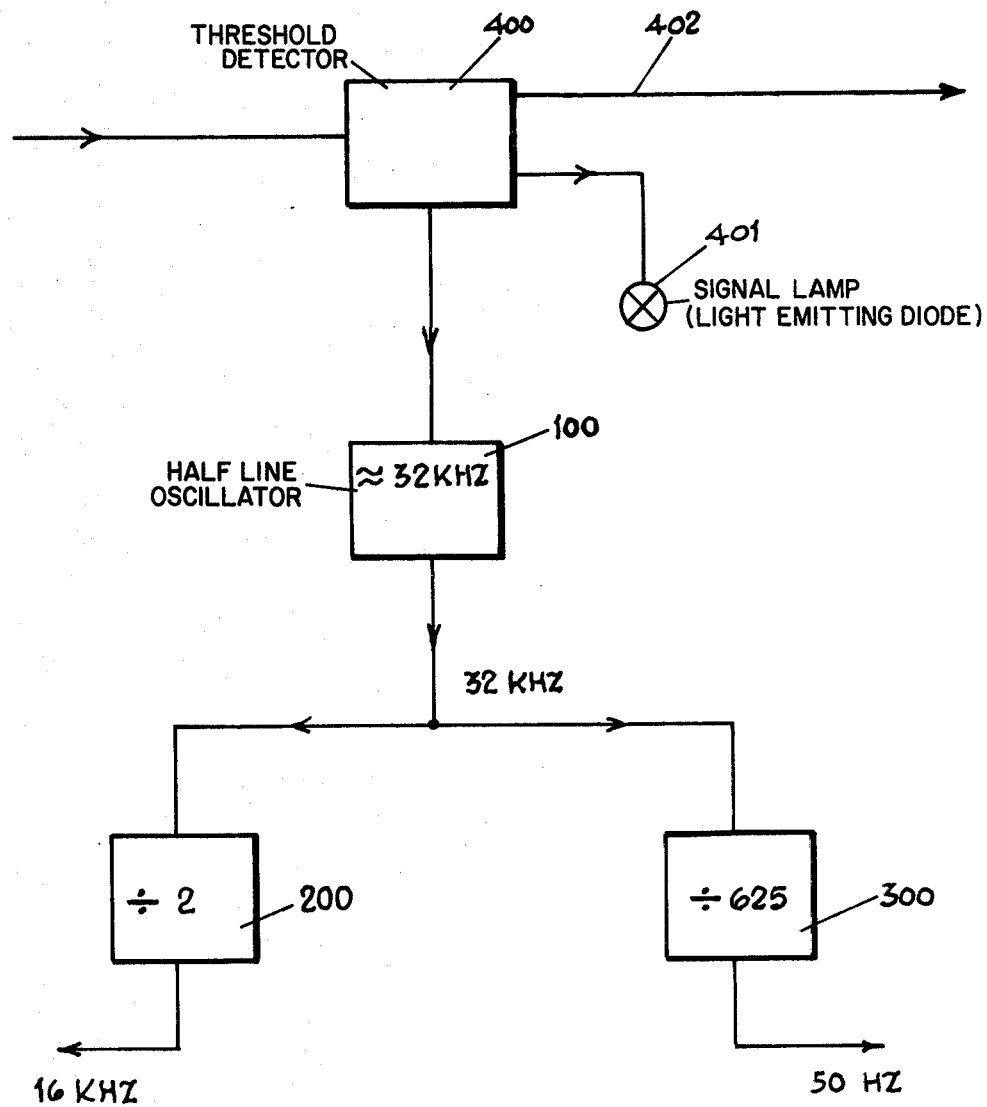

United States Patent [19]

Scott

[11] 4,096,524
[45] Jun. 20, 1978

[54] TELEVISION RECEIVERS

[75] Inventor: Donald Gordon Scott, London, England

[73] Assignee: The General Electric Company Limited, London, England

[21] Appl. No.: 737,046

[22] Filed: Oct. 29, 1976

[30] Foreign Application Priority Data

Nov. 13, 1975 United Kingdom ............... 46892/75

[51] Int. Cl.² .............................................. H04N 7/14
[52] U.S. Cl. ..................................... 358/85; 358/148; 358/181
[58] Field of Search .......................... 358/85, 148, 181; 179/2 TV

[56] References Cited

U.S. PATENT DOCUMENTS

| | | | |
|---|---|---|---|
| 3,372,233 | 3/1968 | Currey | 358/148 X |
| 3,517,127 | 6/1970 | Grace | 358/148 |
| 3,920,901 | 11/1975 | Boehzy et al. | 179/2 TV X |
| 4,007,328 | 2/1977 | Mosca | 358/85 |

*Primary Examiner*—Richard Murray
*Attorney, Agent, or Firm*—Kirschstein, Kirschstein, Ottinger & Cobrin

[57] ABSTRACT

A television receiver equipped for the display of data transmitted during the line flyback period and also for the display of data transmitted over the telephone via a modem is provided with circuitry for detecting the absence of the normal television synchronizing signals and for providing internal synchronizing to enable the continuance of the display of data.

6 Claims, 2 Drawing Figures

TELEVISION RECEIVERS

The present invention relates to television receivers and more particularly to television receivers capable of receiving and displaying data transmitted in digital coded form during the frame blanking interval of the normal television signal. Such a data transmission system is known by and will be referred to hereinafter as a teletext transmission system and such data as teletext data. A receiver suitable for the reception and display of such data is described in U.S. Pat. No. 3,982,065.

It is also proposed to transmit data in a suitably coded form along the normal telephone transmission path to a subscribers telephone instrument and to display by suitable interfacing means the data on a television screen for viewing by the subscriber. Such data will be referred to hereinafter as telephone data. In addition to the circuitry described in U.S. Pat. No. 3,982,065 for the display of Teletext data, a receiver for display of telephone data requires further input signal processing circuitry operating at a lower speed for the storage of telephone data into the same or an additional random access memory. Once stored in a random access memory the data can normally be displayed in the described manner on the television screen using the normal television line and frame synchronising signals.

It is proposed to provide a television receiver which can receive, store and subsequently display both teletext and telephone data.

One problem associated with the provision of such a dual function television receiver is that during the hours when no television signals are broadcast there are no line and frame synchronising signals available at the aerial input of the television receiver to enable stored telephone data to be displayed.

It is an object of the present invention to provide a television receiver for the display of both teletext and telephone data including synchronising means for providing synchronising signals to enable data to be displayed in the absence of normal television synchronising signals.

According to the present invention there is provided a combined television/data receiving apparatus including a display screen, first processing apparatus for processing television signals for display on said display screen, second processing apparatus for processing teletext signals for display of teletext data on said display screen, third processing apparatus for processing telephone data signals for display of telephone data on said display means and including synchronisation generating apparatus for generating synchronising signals for said television display in the absence of normally received television synchronisation.

Figure 2:
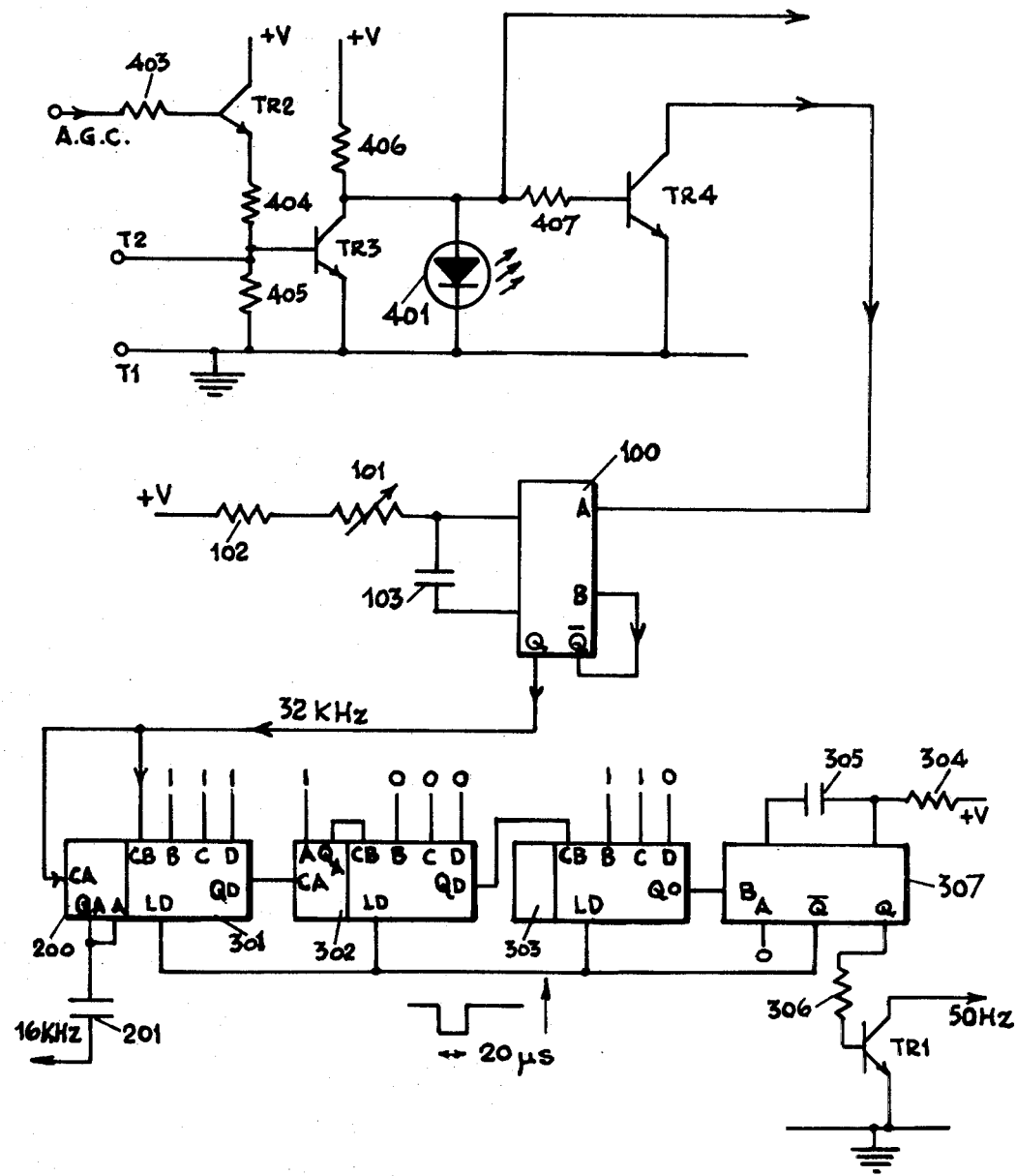

Embodiments of the present invention will now be described, by way of example, with reference to the accompanying drawings in which:

FIG. 1 shows a block diagram of the synchronisation generating appartus according to the present invention; and FIG. 2 shows the synchronisation generating apparatus of FIG. 1 in greater detail.

The television/data receiving apparatus hereinafter described with reference to FIGS. 1 and 2 operates on a 625 line display at 50 Hz with interlacing which gives a total of 25 separate displays per second.

Referring to FIG. 1, the synchronisation generating apparatus includes an oscillator 100 designed to work at 32 KHz since in the preferred embodiment this is approximately twice line frequency (this is often referred to as a "half-line" oscillator). The output of the oscillator is divided by two in a first divider circuit 200 and by 625 in a second divider circuit 300. The output of the divider 200 produces pulses at frame rate and the output of divider 300 produces pulses at line rate.

The oscillator 100 is energised by an output received from a threshold detector 400, which output is present only when the television synchronising signal falls to below a predetermined threshold. When this occurs the oscillator is energised, the signal lamp 401 is lit and a signal is given on line 402 to shut off the normal television sync separator. This is so that any noise and interferance fed to the input of the sync separator will not produce incorrect synchronising signals. The signal lamp 401 is in a preferred embodiment a light emitting diode.

Referring now to FIG. 2, the 32 KHz oscillator 100 is a monostable which is connected to be self-triggering by resistors 101, 102 and capacitor 103, the frequency being adjustable through a small range by the variable resistor 101.

The divide by 625 counter 300 is formed from three presettale 4 bit counters 301, 302, 303. A 10 bit (÷ by 1024) counter is formed from these and at the end of the count a monostable 307 is triggered to produce a 20 msec pulse as determined by a resistor 304 and a capacitor 305. This is used to preset the counter chain to 399 (1024 − 625) thus effectively making the counter a divide by 625. The monostable also turns on TR1 via resistor 306, this output driving the frame timebase of the television via buffer transistor TR1.

The divide by 2 divider 200 for the line pulses may be formed from an unused stage of one of the counters 301, 302 or 303. This has the disadvantage that although the first stages of the counters 301, 302, 303 have independent inputs and outputs they are loaded (preset) with the rest of the counter. Thus the presetting of the counters to 399 for the frame pulse will upset the line count and to prevent this the output of the line counter is fed back to the data input. No such problem will arise if a separate counter is used for the divide by two circuit 200. The line counter feeds through a 5600 pF capacitor 201 to the line oscillator stage of the television.

In the threshold detector 400 transistor TR2 is an emitter follower connected to the automatic gain control (A.G.C.) line of the television set via a resistor 403. The collector of TR2 is connected to the positive voltage rail which in a preferred embodiment is +5 volts and the emitter via a resistor chain 404, 405 to the negative voltage rail (earth). The common point of resistors 404, 405 is connected to the base of a grounded emitter transistor TR3 the collector of which is connected to the positive voltage rail by a resistor 406. The collector voltage of TR3 is used to operate the signal lamp 401, to turn on a transistor TR4 via a resistor 407, transistor TR3 in turn energising the oscillator 100, and to a sync separator shut off terminal of the normal television sync separator (not shown). In the preferred embodiment when the set is receiving a usable signal the A.G.C. line is at > +4v, the potential at the base of TR3 is sufficient to keep it saturated. When the signal fails the A.G.C. line falls to approximately +3.5v, TR3 now cuts-off and the collector voltage rises; this has 3 effects:

(a) The L.E.D. lights.

(b) The T.V. sync separator is disabled in the preferred embodiment by a connection to the "noise gate" input of the line oscillator combination integrated circuit on the line timebase.

(c) TR4 is turned on.

The saturation of TR4 takes the "A" input of the oscillator 100 monostable to a logic 0 thus allowing it to start.

The resistor 403 in the base of TR2 limits the base current and A.G.C. loading during reception of strong signals when the A.G.C. may rise to +8v.

For a setting up procedure the oscillator is set up using a television broadcast signal as reference. The television is set to produce a normal television picture, the resistor 405 is then shorted via terminals $T_1$, $T_2$. This forces the sync generator into operation. The potentiometer 101 is then set for the most stable picture.

An interlaced scan is necessary for the display of teletext and telephone data to allow character rounding to be employed. The circuit provides a simple means of interlacing the line and frame scans of a television.

A frequency stability for the oscillator 100 of about 2% is obtainable and, whilst this is not as high as is usual in television waveform generating equipment, it is quite adequate since the RATIO between the line and frame rates is fixed by the dividers.

In a preferred embodiment of the present invention the following components were used:

Resistors

403: 10 K ohms
404: 220 ohms
405: 68 ohms
406: 100 ohms
407: 10 K ohms
101: 10 K ohms (variable)
102: 39 K ohms
304: 47 K ohms
306: 10 K ohms Capacitors 305: 1500 pF
201: 5600 pF
103: 2200 pF Oscillator 101: $-\frac{1}{2} \times$ 74123 integrated circuit Divide by 625 circuit 300: 3 × 74177 connected as shown Divide by 2 circuit 200: part of first 74177 integrated circuit of divider 300

Transistors TR1, TR2, TR3, TR4 — BC 107
Voltage rails + 5 volts and Earth.

I claim:

1. A combined carrier television receiver and data receiving apparatus comprising:
   (A) television receiver means for deriving video signals from received television carrier signals,
   (B) display means for displaying television picture information contained in said video signals,
   (C) first means for deriving digitally coded data carried by a received television carrier signal during periods when said television carrier signal carries no picture information,
   (D) second means for deriving digitally coded data received over a telephone line,
   (E) means for deriving display signals from said digitally coded data for display of data information on said display means,
   (F) apparatus for generating synchronization signals for said display means, and
   (G) means responsive to the absence of a received television synchronization signal for energizing said synchronization signal generating apparatus.

2. An apparatus as claimed in claim 1 including a threshold detection circuit for monitoring the level of the normally received television synchronizing signal and for energising the synchronization generating apparatus when said received television signal falls below a predetermined level.

3. An apparatus as claimed in claim 2 comprising a sync separator, the threshold detection circuit including output means for inhibiting the operation of the television sync separator when the received television signal falls below the predetermined level.

4. An apparatus as claimed in claim 2 in which the synchronization generating apparatus includes an oscillator energizable by the threshold detection circuit, a first divider for division of the output signals of the oscillator to provide line synchronizing signals for the television display and a second divider for division of the output signals of the oscillator to provide frame synchronizing signals for the television display.

5. An apparatus as claimed in claim 1 including means for indicating when the synchronization generating apparatus is energised.

6. An apparatus as claimed in claim 5 in which the indicating means is a lamp.

* * * * *